US007099824B2

(12) United States Patent
Kushida et al.

(10) Patent No.: US 7,099,824 B2
(45) Date of Patent: Aug. 29, 2006

(54) SPEECH RECOGNITION SYSTEM, SPEECH RECOGNITION SERVER, SPEECH RECOGNITION CLIENT, THEIR CONTROL METHOD, AND COMPUTER READABLE MEMORY

(75) Inventors: Akihiro Kushida, Tochigi (JP); Tetsuo Kosaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 612 days.

(21) Appl. No.: 09/993,570

(22) Filed: Nov. 27, 2001

(65) Prior Publication Data

US 2002/0065652 A1   May 30, 2002

(30) Foreign Application Priority Data

Nov. 27, 2000 (JP) .............................. 2000-360203

(51) Int. Cl.
*G10L 15/00* (2006.01)
(52) U.S. Cl. ..................... 704/231; 704/275; 704/270
(58) Field of Classification Search ................ 704/231, 704/270, 275, 243, 255, 235, 270.1, 246; 382/189
See application file for complete search history.

(56) References Cited

U.S. PATENT DOCUMENTS

| 5,632,002 | A | * | 5/1997 | Hashimoto et al. .......... 704/231 |
| 5,774,628 | A | | 6/1998 | Hemphill .................... 395/2.64 |
| 6,078,886 | A | * | 6/2000 | Dragosh et al. ............. 704/270 |
| 6,125,206 | A | * | 9/2000 | Yokota et al. ............... 382/189 |
| 6,195,641 | B1 | | 2/2001 | Loring et al. ................ 704/275 |
| 6,385,339 | B1 | | 5/2002 | Yokota et al. |

FOREIGN PATENT DOCUMENTS

| EP | 0 945 851 A2 | 9/1999 |
| JP | A 7-140998 | 6/1995 |
| JP | 8-87573 | 4/1996 |
| JP | A 8-272789 | 10/1996 |
| JP | A 11-308270 | 11/1999 |
| JP | A 2000-075887 | 3/2000 |
| JP | A 2000-206983 | 7/2000 |
| KR | A 1999-009682 | 2/1999 |
| KR | A 1999-0077872 | 10/1999 |
| WO | WO 99/26233 | 5/1999 |

OTHER PUBLICATIONS

"Welcome COM Developers!", Microsoft Speech API 4.0, pp. 1-2 & 247 (Updated Aug. 13, 1998).
David Pearce, "Enabling New Speech Driven Services for Mobile Devices: An overview of the ETSI standards activities for Distributed Speech Recognition Front-ends", Motorola Labs, AVIOS 2000: The Speech Applications Conference, May 22-24, 2000, San Jose, CA, USA.

* cited by examiner

*Primary Examiner*—Richemond Dorvil
*Assistant Examiner*—Huyen X. Vo
(74) *Attorney, Agent, or Firm*—Fitzpatrick, Cella, Harper & Scinto

(57) ABSTRACT

A user dictionary, which is formed by storing pronunciations and notations of target recognition words designated by the user in correspondence with each other, input speech recognition data, and dictionary management data used to determine the recognition field of a recognition dictionary used in recognition of the speech recognition data are sent to a server via a communication module. In the server, a dictionary management unit looks up an identifier table to determine a recognition dictionary corresponding to the dictionary management information received from a client from a plurality of kinds of recognition dictionaries. A speech recognition module recognizes the speech recognition data using at least the determined recognition dictionary. The recognition result is sent to the client via a communication module.

11 Claims, 8 Drawing Sheets

FIG. 3

USER DICTIONARY

| PRONUNCIATION | NOTATION |
|---|---|
| スズキタロー | 鈴木太郎 |
| ジタクジュウショ | 神奈川県川崎市中原区今井上町999 |
| ジタクデンワ | 045-222-2222 |
| ケイタイデンワ | 090-1111-1111 |
| ファックス | 045-333-3333 |
| メール | suzuki@xxx.yyy.co.jp |

FIG. 4

| NAME |
| ADDRESS |
| TEL |
| FAX |
| E-MAIL |
| OTHER |

FIG. 5

| INPUT FORM IDENTIFIER | RECOGNITION DICTIONARY IDENTIFIER |
|---|---|
| NAME | NAME |
| ADDRESS | ADDRESS |
| TEL | ALPHANUMERIC SYMBOL |
| FAX | ALPHANUMERIC SYMBOL |
| E-MAIL | ALPHANUMERIC SYMBOL |
| OTHER | DICTATION |

FIG. 7

USER DICTIONARY

| PRONUNCIATION | NOTATION | INPUT FORM IDENTIFIER |
|---|---|---|
| スズキタロー | 鈴木太郎 | NAME |
| ジタクジュウショ | 神奈川県川崎市中原区今井上町999 | ADDRESS |
| ジタクデンワ | 045-222-2222 | TEL |
| ケイタイデンワ | 090-1111-1111 | TEL |
| ファックス | 045-333-3333 | FAX |
| メール | suzuki@xxx.yyy.co.jp | E-MAIL |
| スズキタロー | 鈴木太郎 | OTHER |

FIG. 8

USER DICTIONARY

| PRONUNCIATION | NOTATION | RECOGNITION DICTIONARY IDENTIFIER |
|---|---|---|
| スズキタロー | 鈴木太郎 | NAME |
| ジタクジュウショ | 神奈川県川崎市中原区今井上町53 | ADDRESS |
| ジタクデンワ | 045-222-2222 | ALPHANUMERIC SYMBOL |
| ケイタイデンワ | 090-1111-1111 | ALPHANUMERIC SYMBOL |
| ファックス | 045-333-3333 | ALPHANUMERIC SYMBOL |
| メール | suzuki@xxx.yyy.co.jp | ALPHANUMERIC SYMBOL |
| スズキタロー | 鈴木太郎 | DICTATION |

SPEECH RECOGNITION SYSTEM, SPEECH RECOGNITION SERVER, SPEECH RECOGNITION CLIENT, THEIR CONTROL METHOD, AND COMPUTER READABLE MEMORY

FIELD OF THE INVENTION

The present invention relates to a client-server speech recognition system for recognizing speech input at a client by a server, a speech recognition server, a speech recognition client, their control method, and a computer readable memory.

BACKGROUND OF THE INVENTION

In recent years, speech has been used as an input interface in addition to a keyboard, a mouse, and the like.

However, the recognition rate of speech recognition that recognizes input speech lowers and requires a longer processing time as the number of recognition words which are to undergo speech recognition becomes larger. For this reason, in an actual method, a plurality of recognition dictionaries or lexicons that register recognition words (e.g., pronunciations and notations) which are to undergo speech recognition are prepared, and are selectively used (a plurality of recognition dictionaries may be used at the same time).

Also, unregistered words cannot be recognized. As one of methods for solving this problem, a user dictionary or lexicon (prepared by the user to register recognition words which are to undergo speech recognition) may be used.

On the other hand, a client-server speech recognition system has been studied to implement speech recognition on a terminal with insufficient resources.

These three techniques are known to those who are skilled in the art, but a system that combines these three techniques has not been realized yet.

SUMMARY OF THE INVENTION

The present invention has been made to solve the above problems, and has as its object to provide a speech recognition system which uses a user dictionary in response to a user's request in a client-server speech recognition system so as to improve speech input efficiency and to reduce the processing load on the entire system, a speech recognition server, a speech recognition client, their control method, and a computer readable memory.

According to the present invention, the foregoing object is attained by providing a client-server speech recognition system for recognizing speech input at a client by a server, the client comprising:

speech input means for inputting speech;

user dictionary holding means for holding a user dictionary formed by registering target recognition words designated by a user; and transmission means for transmitting speech data input by said speech input means, dictionary management information used to determine a recognition field of a recognition dictionary used to recognize the speech data, and the user dictionary to the server, and the server comprising:

recognition dictionary holding means for holding a plurality of kinds of recognition dictionaries prepared for respective recognition fields;

determination means for determining one or more recognition dictionaries corresponding to the dictionary management information received from the client from the plurality of kinds of recognition dictionaries; and recognition means for recognizing the speech data using at least the recognition dictionary determined by said determination means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 shows the configuration of a user dictionary of the first embodiment;

FIG. 4 shows a speech input window of the first embodiment;

FIG. 5 shows an identifier table of the first embodiment;

FIG. 7 shows the configuration of a user dictionary appended with input form identifiers according to the third embodiment; and FIG. 8 shows the configuration of a user dictionary appended with recognition dictionary identifiers according to the third embodiment.

DESCRIPTION OF THE PREFERRED EMBODIMENTS

Preferred embodiments of the present invention will be described in detail below with reference to the accompanying drawings.

First Embodiment

Figure 1:
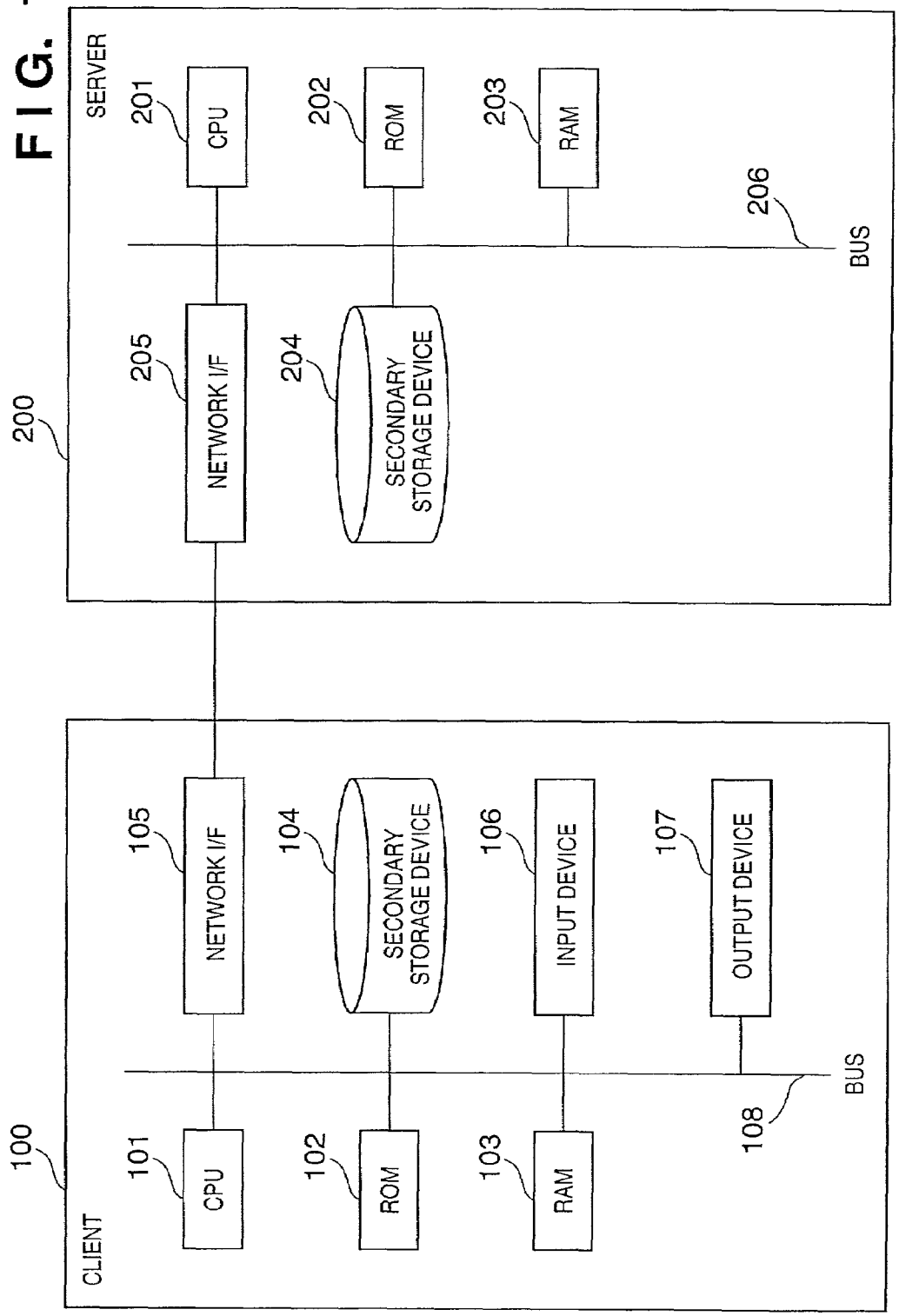
FIG. 1 is a block diagram showing the hardware arrangement of a speech recognition system of the first embodiment.

FIG. 1 shows the hardware arrangement of a speech recognition system of the first embodiment.

A CPU 101 systematically controls an entire client 100. The CPU 101 loads programs stored in a ROM 102 onto a RAM 103, and executes various processes on the basis of the loaded programs. The ROM 102 stores various programs of processes to be executed by the CPU 101. The RAM 103 provides a storage area required to execute various programs stored in the ROM 102.

A secondary storage device 104 stores an OS and various programs. When the client 100 is implemented using not a general-purpose apparatus such as a personal computer or the like but a dedicated apparatus, the ROM 102 may store the OS and various programs. By loading the stored programs onto the RAM 103, the CPU 101 can execute processes. As the secondary storage device 104, a hard disk device, floppy disk drive, CD-ROM, or the like may be used. That is, storage media are not particularly limited.

A network I/F (interface) 105 is connected to a network I/F 205 of a server 200.

An input device 106 comprises a mouse, keyboard, microphone, and the like to allow input of various instructions to processes to be executed by the CPU 101, and can be used by simultaneously connecting these plurality of devices. An output device 107 comprises a display (CRT, LCD, or the like), and displays information input by the input device 106, and display windows which are controlled by various processes executed by the CPU 101. A bus 108 interconnects various building components of the client 100.

A CPU 201 systematically controls the entire server 200. The CPU 201 loads programs stored in a ROM 202 onto a RAM 203, and executes various processes on the basis of the loaded programs. The ROM 202 stores various programs of processes to be executed by the CPU 201. The RAN 203 provides a storage area required to execute various programs stored in the ROM 202.

A secondary storage device 204 stores an OS and various programs. When the server 200 is implemented using not a versatile apparatus such as a personal computer or the like but a dedicated apparatus, the ROM 202 may store the OS and various programs. By loading the stored programs onto the RAM 203, the CPU 201 can execute processes. As the secondary storage device 204, a hard disk device, floppy disk drive, CD-ROM, or the like may be used. That is, storage media are not particularly limited.

The network I/F 205 is connected to the network I/F 105 of the client 100. A bus 206 interconnects various building components of the server 200.

The functional arrangement of the speech recognition system of the first embodiment will be described below using FIG. 2.

Figure 2:
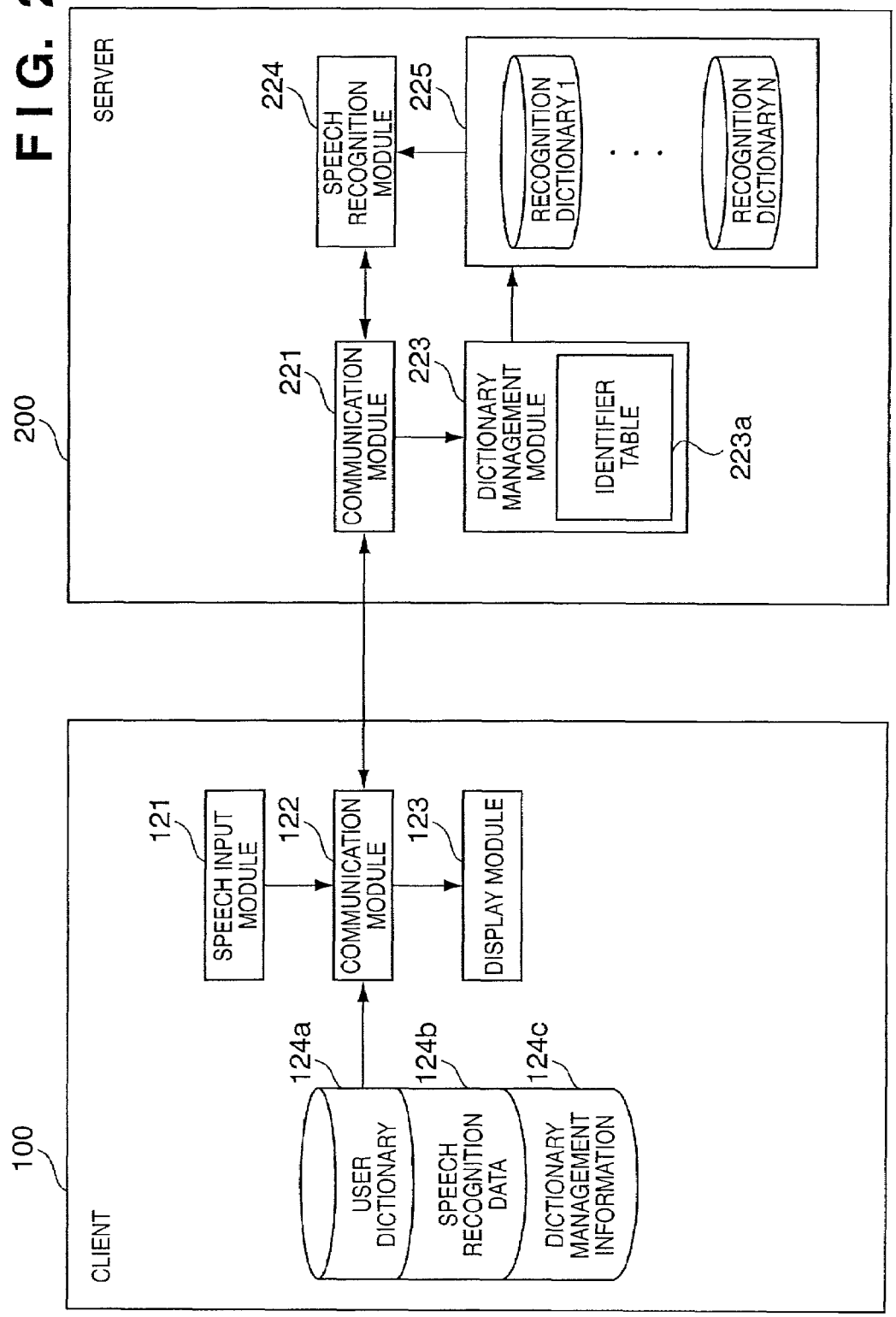
FIG. 2 is a block diagram showing the functional arrangement of the speech recognition system of the first embodiment.

FIG. 2 is a block diagram showing the functional arrangement of the speech recognition system of the first embodiment.

In the client 100, a speech input module 121 inputs speech uttered by the user via a microphone (input device 106), and A/D-converts input speech data (speech recognition data) which is to undergo speech recognition. A communication module 122 sends a user dictionary 124a, speech recognition data 124b, dictionary management information 124c, and the like to the server 200. Also, the communication module 122 receives a speech recognition result of the sent speech recognition data 124b and the like from the server 200.

A display module 123 displays the speech recognition result received from the server 200 while storing it in, e.g., an input form which is displayed on the output device 107 by the process executed by the speech recognition system of this embodiment.

In the server 200, a communication module 221 receives the user dictionary 124a, speech recognition data 124b, dictionary management information 124c, and the like from the client 100. Also, the communication module 221 sends the speech recognition result of the speech recognition data 124b and the like to the client 100.

A dictionary management module 223 switches and selects a plurality of kinds of recognition dictionaries 225 (recognition dictionary 1 to recognition dictionary N, N: a positive integer) prepared for respective recognition fields (e.g., for names, addresses, alphanumeric symbols, and the like), and the user dictionary 124a received from the client 100 (may simultaneously use a plurality of kinds of dictionaries).

Note that the plurality of kinds of recognition dictionaries 225 are prepared for each dictionary management information 124c (input form identifier; to be described later) sent from the client 100. Each recognition dictionary 225 is appended with a recognition dictionary identifier indicating the recognition field of that recognition dictionary. The dictionary management module 223 manages an identifier table 223a that stores the recognition dictionary identifiers and input form identifiers in correspondence with each other, as shown in FIG. 5.

A speech recognition module 224 executes speech recognition using the recognition dictionary or dictionaries 225 and user dictionary 124a designated for speech recognition by the dictionary management module 223 on the basis of the speech recognition data 124b and dictionary management information 124c received from the client 100.

Note that the user dictionary 124a is prepared by the user to register recognition words which are to undergo speech recognition, and stores pronunciations and notations of words to be recognized in correspondence with each other, as shown in, e.g., FIG. 3.

The speech recognition data 124b may be either speech data A/D-converted by the speech input module 121 or data obtained by encoding that speech data.

Figure 4:
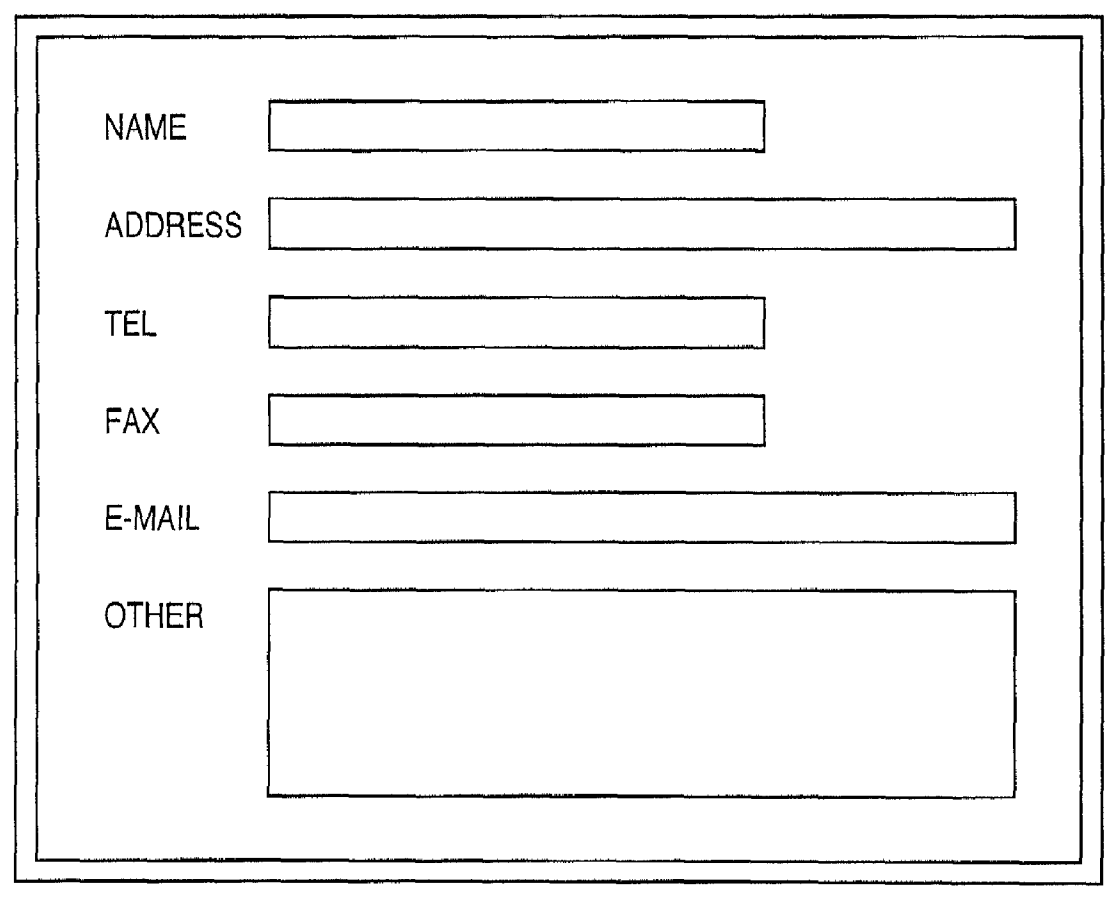

The dictionary management information 124c indicates an input object and the like. For example, the dictionary management information 124c is an identifier (input form identifier) indicating the type of input form when the server 200 recognizes input speech and inputs text data corresponding to that speech recognition result to each input form, which defines a speech input window displayed by the speech recognition system of the first embodiment, as shown in FIG. 4. The client 100 sends this input form identifier to the server 200 as the dictionary management information 124c. In the server 200, the dictionary management module 223 looks up the identifier table 223a to acquire a recognition dictionary identifier corresponding to the received input form identifier, and determines a recognition dictionary 225 to be used in speech recognition.

The process executed by the speech recognition system of the first embodiment will be explained below using FIG. 6.

Figure 6:
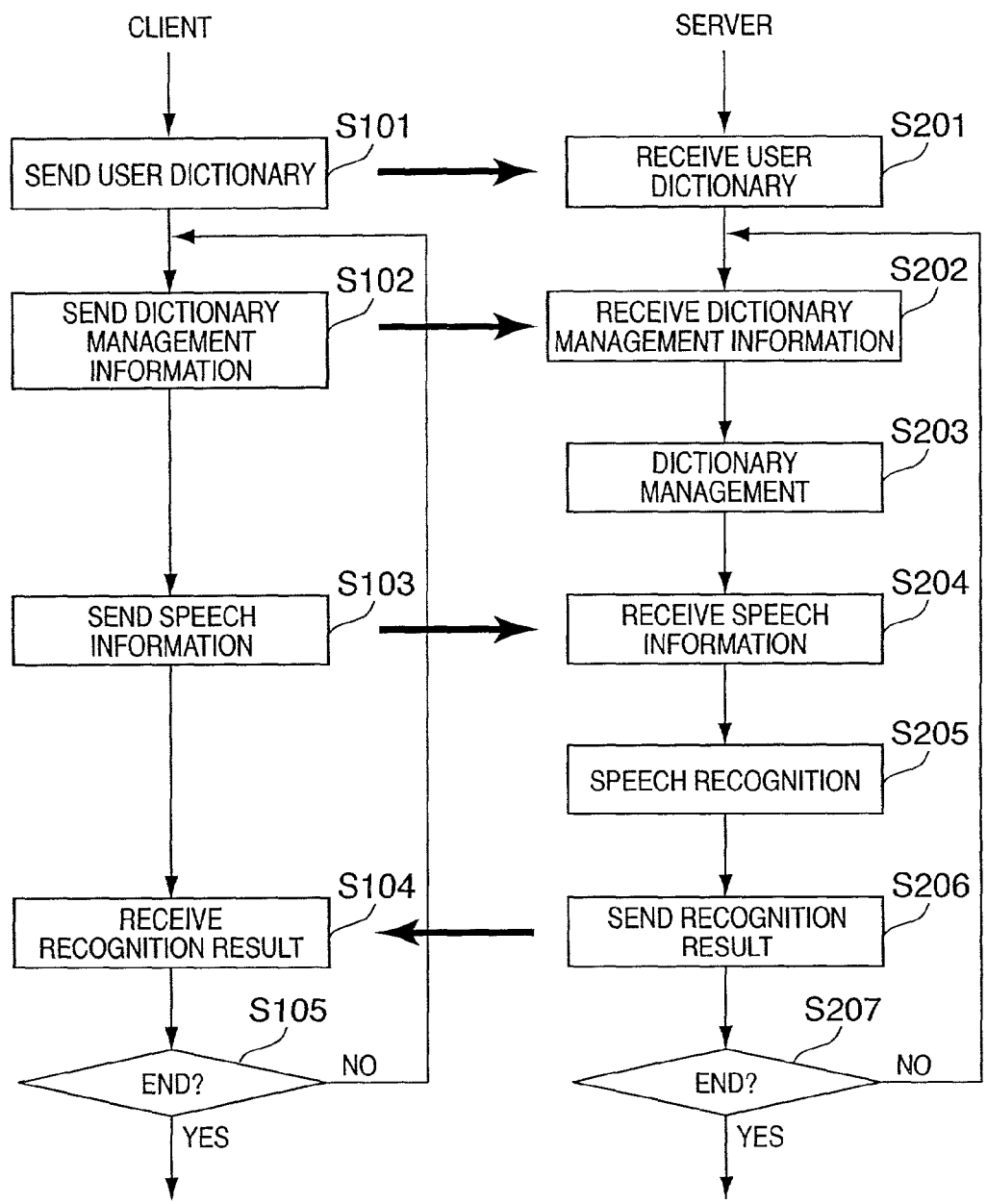
FIG. 6 is a flow chart showing the process executed by the speech recognition system of the first embodiment.

FIG. 6 is a flow chart showing the process executed by the speech recognition system of the first embodiment.

In step S101, the client 100 sends the user dictionary 124a to the server 200.

In step S201, the server 200 receives the user dictionary 124a from the client 100.

In step S102, when speech is input to an input form as a target speech input, the client 100 sends the input form identifier of that input form to the server 200 as the dictionary management information 124c.

In step S202, the server 200 receives the input form identifier from the client 100 as the dictionary management information 124c.

In step S203, the server 200 looks up the identifier table 223a using the dictionary management information 124c to acquire a recognition dictionary identifier corresponding to the received input form identifier, and determines a recognition dictionary 225 to be used in speech recognition.

In step S103, the client 100 sends speech recognition data 124b, which is speech-input as text data to be input to each input form, to the server 200.

In step S204, the server 200 receives the speech recognition data corresponding to each input form from the client 100.

In step S205, the server 200 executes speech recognition of the speech recognition data 124b in the speech recognition module 224 using the recognition dictionary 225 and user dictionary 124a designated for speech recognition by the dictionary management module 223.

In the first embodiment, all recognition words contained in the user dictionary 124a sent from the client 100 to the server 200 are used in speech recognition by the speech recognition module 224.

In step S206, the server 200 sends the speech recognition result obtained by the speech recognition module 224 to the client 100.

In step S104, the client 100 receives the speech recognition result corresponding to each input form from the server 200, and stores text data corresponding to the speech recognition result in the corresponding input form.

The client 100 checks in step S105 if the processing is to be ended. If the processing is not to be ended (NO in step S105), the flow returns to step S102 to repeat the processing. On the other hand, if the processing is to be ended (YES in step S105), the client 100 informs the server 200 of end of the processing, and ends the processing.

It is checked in step S207 if a processing end instruction from the client 100 is detected. If no processing end instruction is detected (NO in step S207), the flow returns to step S202 to repeat the above processes. On the other hand, if the processing end instruction is detected (YES in step S207), the processing ends.

In the above processing, when speech is input to an input form as a target speech input, the dictionary management information 124c corresponding to that input form is sent from the client 100 to the server 200. Alternatively, the dictionary management information 124c may be sent when the input form as a target speech input is focused by an instruction from the input device 106 (the input form as a target speech input is determined).

In the server 200, speech recognition is made after all speech recognition data 124b are received. Alternatively, every time speech is input as text data to a given input form, that portion of speech recognition data 124b may be sent to the server 200 frame by frame (for example, one frame is 10 msec of speech data), and speech recognition may be made in real time.

As described above, according to the first embodiment, in the client-server speech recognition system, since the server 200 executes speech recognition of speech recognition data 124b using both an appropriate recognition dictionary 225 and the user dictionary 124a, the speech recognition precision in the server 200 can be improved while reducing the processing load and use of storage resources associated with speech recognition in the client 100.

Second Embodiment

In the first embodiment, if no recognition words to be stored in the user dictionary 124a are generated, since the user dictionary 124a need not be used, the server 200 may use all recognition words in the user dictionary 124a in recognition only when a use request of the user dictionary 124a is received from the client 100.

In this case, a flag indicating if the user dictionary 124a is used is added as the dictionary management information 124c, thus informing the server 200 of the presence/absence of use of the user dictionary 124a.

Third Embodiment

Since some target recognition words in the user dictionary 124a are not used depending on an input object, situation, and the like, only specific recognition words in the user dictionary 124a may be used in recognition depending on the input object and situation.

In such case, when the user dictionary is managed by designating input form identifiers for respective recognition words, as shown in FIG. 7, only recognition words having an input form identifier of the input form used in speech input can be used in recognition. Alternatively, a plurality of input form identifiers may be designated for a given recognition word. In addition, the user dictionary may be managed by designating recognition dictionary identifiers in place of input form identifiers, as shown in FIG. 8.

Fourth Embodiment

By combining the second and third embodiments, the efficiency of the speech recognition process of the speech recognition module 224 can be further improved.

Fifth Embodiment

Most of the processes of the apparatus of the present invention can be implemented by programs. As described above, since the apparatus can use a general-purpose apparatus such as a personal computer, the present invention is also achieved by supplying a storage medium, which records a program code of a software program that can implement the functions of the above-mentioned embodiments to a system or apparatus, and reading out and executing the program code stored in the storage medium by a computer of the system or apparatus. In this case, the program code itself read out from the storage medium implements the functions of the above-mentioned embodiments, and the storage medium which stores the program code constitutes the present invention. As the storage medium for supplying the program code, for example, a floppy disk, hard disk, optical disk, magneto-optical disk, CD-ROM, magnetic tape, nonvolatile memory card, ROM, and the like may be used.

The present invention can also be achieved by supplying the storage medium that records the program code to a computer, and executing some or all of actual processes executed by an OS running on the computer. Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit. When the present invention is applied to the storage medium, that storage medium stores a program code corresponding to the flow chart shown in FIG. 3.

As many apparently widely different embodiments of the present invention can be made without departing from the spirit and scope thereof, it is to be understood that the invention is not limited to the specific embodiments thereof except as defined in the appended claims.

What is claimed is:

1. A client-server speech recognition system comprising:
   a client comprising:
   display control means for controlling the display of a speech input window comprising plural input forms;
   determining means for determining from among the displayed plural input forms an input form to which speech information is input as a target speech input;
   first transmission means for transmitting input form identifying information indicating the input form determined when said determining means determines the input form;
   storing means for storing a user dictionary which holds target recognition words and input form identifying information in association with each other;

speech receiving means for receiving the speech information inputted by a speech input module, second transmission means for transmitting the user dictionary and the speech information to the server; and inputting means for inputting a speech recognition result received from the server to the input form to which the speech information is determined to be input by said determining means; and a server comprising:

holding means for holding a plurality of kinds of recognition dictionaries, and a table managing a correspondence of the input form identifying information and each of the plurality of kinds of recognition dictionaries;

first receiving means for receiving the input form identifying information;

setting means for setting one or more recognition dictionaries corresponding to the received input form identifying information from said holding means by referring to the table;

second receiving means for receiving the user dictionary and the speech information;

speech recognition means for recognizing the speech information using (i) the target recognition words of the user dictionary associated with the input form to which speech is determined by said determining means to have been input that is identified by the received input form identifying information and (ii) the one or more recognition dictionaries set by the setting means; and third transmission means for transmitting the speech recognition result of said speech recognition means to the client.

2. In a client-server speech recognition system, wherein the server has holding means for holding a plurality of kinds of recognition dictionaries, and a table managing a correspondence of input form identifying information and each of the plurality of kinds of recognition dictionaries, an information processing apparatus acting as a client comprising:

display control means for controlling the display of a speech input window comprising plural input forms;

determining means for determining from among the displayed plural input forms an input form to which speech information is input as a target speech input;

first transmission means for transmitting to the server input form identifying information indicating the input form determined when said determining means determines the input form;

storing means for storing a user dictionary which holds target recognition words and input form identifying information in association with each other;

speech receiving means for receiving the speech information inputted by a speech input module, using a displayed input form;

second transmission means for transmitting the user dictionary and the speech information to the server; and inputting means for inputting a speech recognition result received from the server to the input form to which the speech information is determined to be input by said determining means, wherein the server sets one or more recognition dictionaries corresponding to the received input form identifying information transmitted by said first transmission means from said holding means by referring to the table, and recognizes the received speech information transmitted by said second transmission means using (i) the target recognition words of the received user dictionary transmitted by said second transmission means associated with the input form to which the speech is determined by said determining means to have been input that is identified by the received input form identifying information and (ii) the one or more recognition dictionaries, and transmits the speech recognition result to the client.

3. In a client-server speech recognition system for recognizing, by a server, speech input at a client for inputting information to an input form, the client having display control means for controlling the display of a speech input window comprising plural input forms, determining means for determining from among the displayed plural input forms an input form to which speech information is input as a target speech input, and transmission means for transmitting input form identifying information indicating the input form determined when said determining means determines the input form, an information processing apparatus acting as the server comprising:

holding means for holding a plurality of kinds of recognition dictionaries, and a table managing a correspondence of input form identifying information and each of the plurality of kinds of recognition dictionaries;

first receiving means for receiving the input form identifying information transmitted by said transmission means;

setting means for setting one or more recognition dictionaries corresponding to the received input form identifying information from said holding means by referring to the table;

second receiving means for receiving from the client speech information and a user dictionary that holds target recognition words and input form identifying information in association with each other; and speech recognition means for recognizing speech information using (i) the target recognition words of the user dictionary associated with the input form to which the speech inputted by the client is inputted as identified by the received input form identifying information and (ii) one or more recognition dictionaries set by the setting means, wherein the client inputs a speech recognition result received from the server to the input form to which the speech information is determined to be input by said determining means.

4. A client-server speech recognition system comprising:

a client comprising:

display control means for controlling the displaying of a speech input window comprising plural input forms;

determining means for determining from among the displayed plural input forms an input form to which speech information is input as a target speech input;

first transmission means for transmitting input form identifying information indicating the input form determined when said determining means determines the input form;

speech receiving means for receiving the speech information inputted by a speech input module;

second transmission means for transmitting (i) a user dictionary that holds target recognition words and input form identifying information in association with each other and (ii) the speech information to the server; and inputting means for inputting a speech recognition result received from the server to the input form to which the speech information is determined to be input by said determining means; and a server comprising:

holding means for holding a plurality of kinds of recognition dictionaries, and a table managing a correspondence of the input form identifying information and each of the plurality of kinds of recognition dictionaries;

first receiving means for receiving the input form identifying information;

setting means for setting one or more recognition dictionaries corresponding to the received input form identifying information from said holding means by referring to the table;

second receiving means for receiving the user dictionary and the speech information;

speech recognition means for recognizing the speech information using (i) the target recognition words of the user dictionary associated with the input form to which speech is determined by said determining means to have been input that is identified by the received input form identifying information and (ii) the one or more recognition dictionaries set by the setting means; and third transmission means for transmitting the speech recognition result of said speech recognition means to the client.

5. A client-server speech recognition apparatus comprising:

a client comprising:

display control means for controlling the displaying of a speech input window comprising plural input forms;

determining means for determining from among the displayed plural input forms an input form to which speech information is input as a target speech input;

first transmission means for transmitting input form identifying information indicating the input form determined when said determining means determines the input form;

speech receiving means for receiving the speech information inputted by a speech input module;

second transmission means for transmitting (i) a user dictionary that holds target recognition words and input form identifying information in association with each other and (ii) the speech information to the server; and inputting means for inputting a speech recognition result received from the server to the input form to which the speech information is determined to be input by said determining means; and a server comprising:

holding means for holding a plurality of kinds of recognition dictionaries, and a table managing a correspondence of the input form identifying information and each of the plurality of kinds of recognition dictionaries;

first receiving means for receiving the input form identifying information;

setting means for setting one or more recognition dictionaries corresponding to the received input form identifying information from said holding means by referring to the table;

second receiving means for receiving the user dictionary and the speech information;

speech recognition means for recognizing the speech information using (i) the target recognition words of the user dictionary associated with the input form to which speech is determined by said determining means to have been input that is identified by the received input form identifying information and (ii) the one or more recognition dictionaries set by the setting means; and third transmission means for transmitting a speech recognition result of said speech recognition means to the client.

6. In a client-server speech recognition system, wherein the server has holding means for holding a plurality of kinds of recognition dictionaries, and a table managing a correspondence of input form identifying information and each of the plurality of kinds of recognition dictionaries, a method of controlling an information processing apparatus acting as a client comprising:

a display control step of controlling the displaying of a speech input window comprising plural input forms;

a determining step of determining from among the displayed plural input forms an input form to which speech information is input as a target speech;

a first transmission step of transmitting to the server input form identifying information indicating the input form determined in said determining step when the input form is determined;

a speech receiving step of receiving the speech information inputted by a speech input module;

a second transmission step of transmitting a user dictionary which holds target recognition words and input form identifying information in association with each other, and the speech information, to the server; and an inputting step of inputting a speech recognition result received from the server to the input form to which the speech information is determined to be input in said determining step, wherein the server sets one or more recognition dictionaries corresponding to the received input form identifying information transmitted in said first transmission step from said holding means by referring to the table, and recognizes the received speech information transmitted in said second transmission step using (i) the target recognition words of the received user dictionary transmitted in said second transmission step associated with the input form to which the speech is determined in said determining step to have been input that is identified by the received input form identifying information and (ii) the one or more recognition dictionaries, and transmits the speech recognition result to the client.

7. In a client-server speech recognition system for recognizing, by a server, speech input at a client for inputting information to an input form, the client having display control means for controlling the display of a speech input window comprising plural input forms, determining means for determining from among the displayed plural input forms an input form to which speech information is input as a target speech input, and transmission means for transmitting input form identifying information indicating the input form determined when said determining means determines the input form, a method of controlling an information processing apparatus acting as the server comprising:

a first receiving step of receiving input form identifying information transmitted by said transmission means;

a setting step of setting one or more recognition dictionaries corresponding to the received input form identifying information from a holding means that holds a plurality of kinds of recognition dictionaries by referring to a table managing a correspondence of the input form identifying information and each of the plurality of kinds of recognition dictionaries;

a second receiving step of receiving from the client a user dictionary and speech information, the user dictionary holding target recognition words and input form identifying information in association with each other; and a speech recognition step of recognizing the speech information using (i) the target recognition words of the user dictionary associated with the input form to which the speech information is input, identified by the received input form identifying information and (ii) one or more recognition dictionaries set in said setting step, wherein the client inputs a speech recognition result received from the server to the input form to which the speech information is determined to be input by said determining means.

8. In a client-server speech recognition system, wherein the server has holding means for holding a plurality of kinds of recognition dictionaries, and a table managing a correspondence of input form identifying information and each of the plurality of kinds of recognition dictionaries, a method of performing speech recognition comprising:

at the client side:

a display control step of controlling the displaying of a speech input window comprising plural input forms;

a determining step of determining from among the displayed plural input forms an input form to which speech information is input as a target speech;

a first transmission step of transmitting input form identifying information indicating the input form determined when said determining step determines the input form;

a speech receiving step of receiving the speech information inputted by a speech input module, using an input form;

a second transmission step of transmitting (i) a user dictionary that holds target recognition words and input form identifying information in association with each other and (ii) the speech information to the server; and an inputting step of inputting a speech recognition result received from the server to the input form to which the speech information is determined to be input in said determining step; and at the server side:

a first receiving step of receiving the input form identifying information;

a setting step of setting one or more recognition dictionaries corresponding to the received input form identifying information from said holding means by referring to the table;

a second receiving step of receiving the user dictionary and the speech information;

a speech recognition step of recognizing the speech information using (i) the target recognition words of the user dictionary associated with the input form to which speech is determined in said determining step to have been input that is identified by the received input form identifying information and (ii) the one or more recognition dictionaries set by the setting means; and a third transmission step of transmitting a speech recognition result of said speech recognition step to the client.

9. In a client-server speech recognition system, wherein the server has holding means for holding a plurality of kinds of recognition dictionaries, and a table managing a correspondence of input form identifying information and each of the plurality of kinds of recognition dictionaries, a computer readable memory that stores program code of control of an information processing apparatus acting as a client comprising:

program code of a display control step of controlling the displaying of a speech input window comprising plural input forms;

program code of a determining step of determining from among the displayed plural input forms an input form to which speech information is input as a target speech;

program code of a first transmission step of transmitting to the server input form identifying information indicating the input form determined in the determining step when the input form is determined;

program code of a speech receiving step of receiving the speech information inputted by a speech input module, using an input form;

program code of a second transmission step of transmitting a user dictionary which holds target recognition words and input form identifying information in association with each other, and the speech information, to the server; and program code of an inputting step of inputting a speech recognition result received from the server to the input form to which the speech information is determined to be input in the determining step, wherein the server sets one or more recognition dictionaries corresponding to the received input form identifying information transmitted in said first transmission step from said holding means by referring to the table, and recognizes the received speech information transmitted in said second transmission step using (i) the target recognition words of the received user dictionary transmitted in said second transmission step associated with the input form to which the speech is determined in said determining step to have been input that is identified by the received input form identifying information and (ii) the one or more recognition dictionaries, and transmits the speech recognition result to the client.

10. In a client-server speech recognition system for recognizing, by a server, speech input at a client for inputting information to an input form, the client having display control means for controlling the display of a speech input window comprising plural input forms, determining means for determining from among the displayed plural input forms an input form to which speech information is input as a target speech input, and transmission means for transmitting input form identifying information indicating the input form determined when said determining means determines the input form, a computer readable memory that stores program code of control of an information processing apparatus acting as the server comprising:

program code of a first receiving step of receiving input form identifying information transmitted by said transmission means;

program code of a setting step of setting one or more recognition dictionaries corresponding to the received input form identifying information from a holding means that holds a plurality of kinds of recognition dictionaries by referring to a table managing a correspondence of the input form identifying information and each of the plurality of kinds of recognition dictionaries;

program code of a second receiving step of receiving from the client a user dictionary and speech information, the user dictionary holding target recognition words and input form identifying information in association with each other; and program code of a speech recognition step of recognizing the speech information using (i) the target recognition words associated with the input form to which the speech information is input, identified by the received input form identifying information and (ii) one or more recognition dictionaries set in the setting step, wherein the client inputs a speech recognition result received from the server to the input form to which the speech information is determined to be input by said determining means.

11. In a client-server speech recognition system, wherein the server has holding means for holding a plurality of kinds of recognition dictionaries, and a table managing a correspondence of input form identifying information and each of the plurality of kinds of recognition dictionaries, a computer readable memory that stores program code for performing speech recognition, comprising:

program code of a display control step of controlling the displaying of a speech input window comprising plural input forms;

program code of a determining step of determining from among the displayed plural input forms an input form to which speech information is input as a target speech;

program code of a first transmission step of transmitting to the server input form identifying information indicating the input form determined when said determining step determines the input form;

program code of a speech receiving step of receiving the speech information inputted by a speech input module;

program code of a second transmission step of transmitting (i) a user dictionary that holds target recognition words and input form identifying information in association with each other and (ii) the speech information to the server;

program code of an inputting step of inputting a speech recognition result received from the server to the input form to which the speech information is determined to be input in said determining step;

program code of a first receiving step of receiving from the client the input form identifying information;

program code of a setting step of setting one or more recognition dictionaries corresponding to the received input form identifying information from said holding means by referring to the table;

program code of a second receiving step of receiving from the client the user dictionary and the speech information;

program code of a speech recognition step of recognizing the speech information using (i) the target recognition words of the user dictionary associated with the input form to which speech is determined in said determining step to have been input that is identified by the received input form identifying information and (ii) the one or more recognition dictionaries set in the setting step; and program code of a third transmission step of transmitting a speech recognition result of the speech recognition step to the client.

* * * * *

UNITED STATES PATENT AND TRADEMARK OFFICE
CERTIFICATE OF CORRECTION

| | | |
|---|---|---|
| PATENT NO. | : 7,099,824 B2 | Page 1 of 1 |
| APPLICATION NO. | : 09/993570 | |
| DATED | : August 29, 2006 | |
| INVENTOR(S) | : Akihiro Kushida et al. | |

It is certified that error appears in the above-identified patent and that said Letters Patent is hereby corrected as shown below:

<u>COLUMN 3</u>
Line 9, "RAN 203" should read --RAM 203--.

Signed and Sealed this

Twenty-fourth Day of April, 2007

JON W. DUDAS
*Director of the United States Patent and Trademark Office*